(12) United States Patent
Dunn et al.

(10) Patent No.: US 10,488,176 B2
(45) Date of Patent: Nov. 26, 2019

(54) EDGE REGISTRATION FOR INTERFEROMETRY

(71) Applicant: Corning Incorporated, Corning, NY (US)

(72) Inventors: Thomas James Dunn, Penfield, NY (US); Paul Francis Michaloski, Rochester, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/624,222

(22) Filed: Jun. 15, 2017

(65) Prior Publication Data

US 2017/0363414 A1  Dec. 21, 2017

Related U.S. Application Data

(60) Provisional application No. 62/351,609, filed on Jun. 17, 2016.

(51) Int. Cl.
*G01B 9/02* (2006.01)
*G01B 11/30* (2006.01)

(52) U.S. Cl.
CPC ..... *G01B 9/02078* (2013.01); *G01B 9/02043* (2013.01); *G01B 11/306* (2013.01); *G01B 2290/50* (2013.01)

(58) Field of Classification Search
CPC ............ G01B 11/2441; G01B 9/02057; G01B 9/02039; G01B 11/24; G01B 9/02043; G01B 9/02078; G01B 11/306; G01B 9/02015; G01B 11/255; G01B 11/30; G01N 2021/8822; G01N 21/95623; G01N 2021/8825; G01M 11/0264; G01M 11/0271; G01M 11/0257; G01M 11/0278; G03F 7/70591; G03F 7/706; G03F 7/7065
See application file for complete search history.

(56) References Cited

U.S. PATENT DOCUMENTS

| | | | |
|---|---|---|---|
| 5,177,559 A | 1/1993 | Batchelder et al. | |
| 5,561,525 A | 10/1996 | Toyonaga et al. | |
| 5,770,850 A * | 6/1998 | Bowen | G01J 1/02 250/203.1 |
| 5,953,130 A | 9/1999 | Benedict et al. | |
| 6,108,089 A * | 8/2000 | Shiraishi | G03F 9/7092 356/615 |
| 7,164,475 B2 | 1/2007 | Fairley et al. | |
| 7,436,503 B1 | 10/2008 | Chen et al. | |

(Continued)

OTHER PUBLICATIONS

International Search Report and Written Opinion PCT/US2017/037810 dated Sep. 1, 2017.

*Primary Examiner* — Violeta A Prieto
(74) *Attorney, Agent, or Firm* — John P. McGroarty

(57) ABSTRACT

A metrology apparatus has an illumination source that directs collimated light to a reference surface and to an optical component having a test surface that is in parallel with the reference surface. A first imaging lens defines a Fourier transform plane for light reflected from the reference surface and the test surface. A spatial filtering element is actuable to a blocking position that blocks specular light at the transform plane. A second imaging lens forms, at an image plane, an image of the test surface. A sensor array generates image data from received light at the image plane.

15 Claims, 13 Drawing Sheets

(56) References Cited

U.S. PATENT DOCUMENTS

| | | | |
|---|---|---|---|
| 9,678,021 B2* | 6/2017 | Urano | G01N 21/95623 |
| 2005/0200729 A1* | 9/2005 | Sasagawa | H04N 5/23216 |
| | | | 348/240.99 |
| 2007/0229833 A1* | 10/2007 | Rosencwaig | G01B 11/303 |
| | | | 356/426 |
| 2008/0117436 A1* | 5/2008 | Altenberger | G01B 9/02057 |
| | | | 356/521 |
| 2009/0086207 A1 | 4/2009 | Dohse | |
| 2009/0225539 A1 | 9/2009 | Baldwin et al. | |
| 2011/0075928 A1 | 3/2011 | Jeong et al. | |
| 2012/0075606 A1 | 3/2012 | Nelson et al. | |
| 2012/0154819 A1* | 6/2012 | Cobb | G01B 11/2441 |
| | | | 356/513 |
| 2012/0274931 A1 | 11/2012 | Otani et al. | |
| 2012/0307258 A1 | 12/2012 | Koerner et al. | |
| 2013/0010283 A1* | 1/2013 | Villiger | G01J 3/453 |
| | | | 356/72 |
| 2016/0041092 A1* | 2/2016 | Urano | G01N 21/95623 |
| | | | 356/237.5 |

* cited by examiner

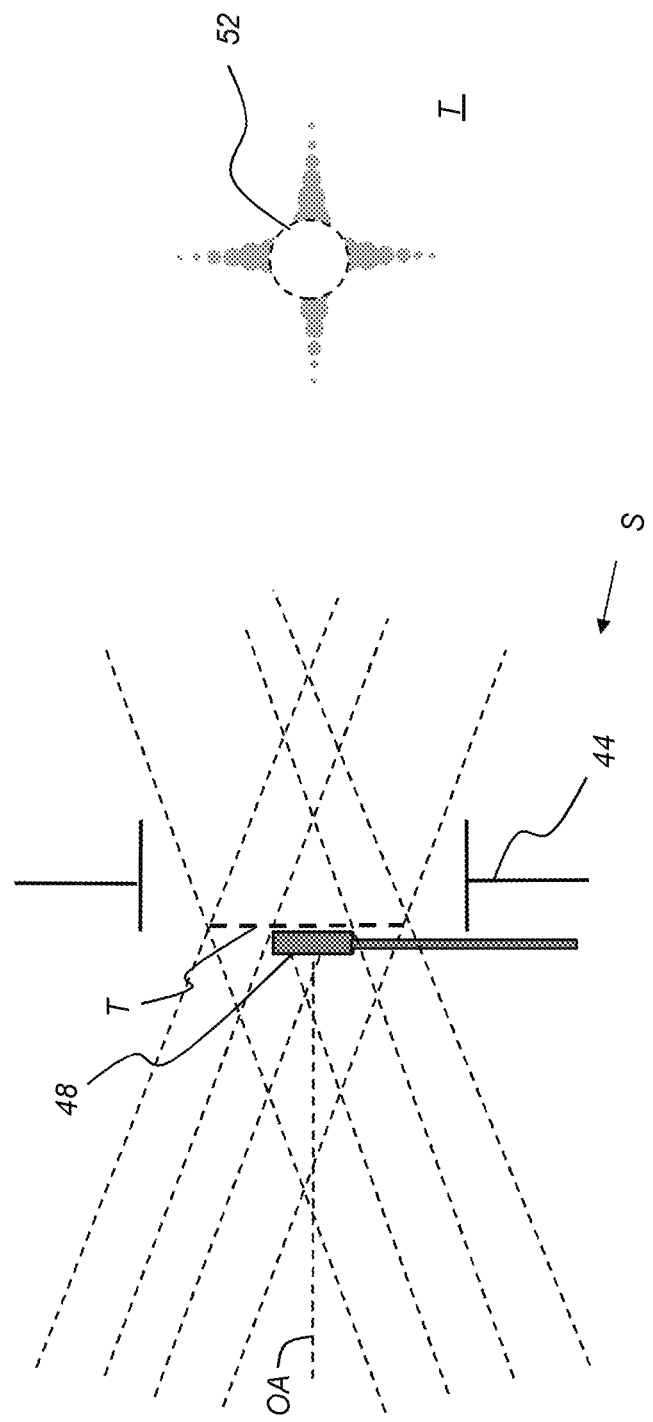

EDGE REGISTRATION FOR INTERFEROMETRY

This application claims the benefit of priority under 35 U.S.C. § 119 of U.S. Provisional Application Ser. No. 62/351,609 filed on Jun. 17, 2016, the content of which is relied upon and incorporated herein by reference in its entirety.

FIELD OF THE INVENTION

The disclosure relates generally to optical metrology apparatus and methods and more particularly to apparatus and methods for precision edge registration of an optical surface.

BACKGROUND

As microelectronics advances to higher levels of component density, the optical tools used to fabricate the desired patterns on electronic substrate surfaces continue to achieve higher levels of performance. Advanced utilities such as extreme ultraviolet (EUV) optical lithography are being developed to meet the challenges of next-generation electronics fabrication. However, fabrication of the components used, such as patterned masks or reticles, can impose precision and accuracy requirements that can be difficult to achieve using conventional measurement methods.

In response to the need for higher levels of precision, metrology methods have been developed to characterize features such as surface flatness using interferometry. Surface flatness can be of particular significance for reflective systems. Even slight deviations from an ideal plane can lead to unacceptable image placement errors in the lithography process. In some cases, flatness of a reflective component is measured a number of times, with the component clamped in a number of different positions, helping to compensate for possible errors due to weight and gravity, as well as due to clamping characteristics.

Flatness measurement can be also influenced by thickness variation of a mask or other reflective component. Where thickness of the component is non-uniform, even a highly precise electrostatic clamping apparatus can effectively transfer thickness or surface variations between surfaces, compounding measurement error.

In order to characterize the component flatness with sufficient accuracy, it is useful to accurately register edges of the surface or surfaces when the component is supported in its measurement fixture. As the component is re-positioned when making a series of measurements, the capability for precise re-registration can help to reduce error sources in the metrology process. Existing methods for achieving precise registration, however, often lack the needed repeatability for accurate measurement when mounting the component in its fixture. Methods that require fiducial or alignment marks are useful only on one side of a mask or reticle and cannot be used until later stages in mask patterning. The alignment problem is further compounded by workflow, with the need to examine the component multiple times during its fabrication cycle. Ambiguous or uncertain results in component positioning can lead to accumulated errors that can compromise the high levels of performance needed for component fabrication. Thus, there is a need to provide apparatus and methods that improve registration of flat optical components.

SUMMARY OF THE INVENTION

It is an object of the present disclosure to advance the art of surface edge registration in optical metrology. Embodiments of the present disclosure address the need for methods that position an optical component in a fixture and allow edges to be clearly and accurately registered using a metrology positioning system.

According to an embodiment of the present disclosure, there is provided a metrology apparatus comprising:
   a) an illumination source that directs collimated light to a reference surface and to an optical component having a test surface that is in parallel with the reference surface;
   b) a first imaging lens that defines a Fourier transform plane for light reflected from the reference surface and the test surface;
   c) a spatial filtering element that is actuable to a blocking position that blocks specular light at the transform plane;
   d) a second imaging lens that forms, at an image plane, an image of the test surface; and
   e) a sensor array disposed to generate image data from received light at the image plane.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 7B shows an enlarged view of the Fourier transform plane in a dark field imaging mode.

DETAILED DESCRIPTION OF THE INVENTION

Figure 1:
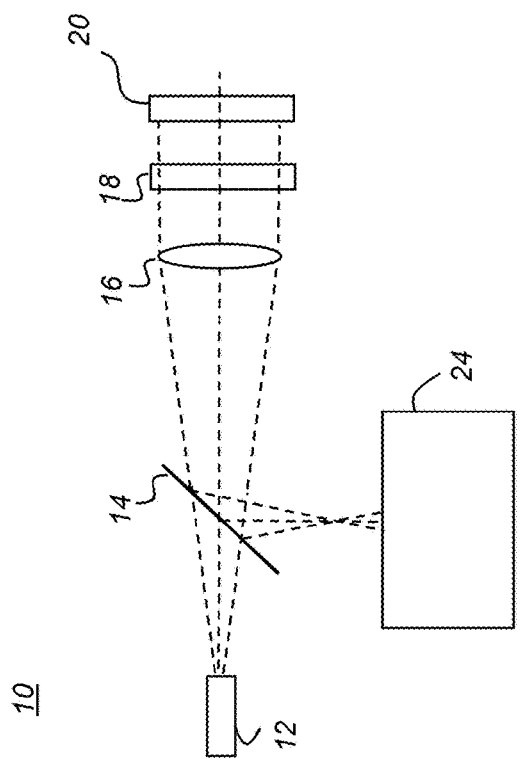
FIG. 1 is a simplified schematic of a conventional Fizeau interferometer apparatus.

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation.

The figures provided may not show various supporting components, including optical mounts, power sources and mounting for light sources, and other features. It can be appreciated by those skilled in the optical arts that embodiments of the present invention can use any of a number of types of standard mounts and support components.

In the context of the present disclosure, terms such as "top" and "bottom" or "above" and "below" or "beneath" are relative and do not indicate any necessary orientation of a component or surface, but are used simply to refer to and distinguish views, opposite surfaces, spatial relationships, or different light paths within a component or apparatus. Similarly, terms "horizontal" and "vertical" may be used relative to the figures, to describe the relative orthogonal relationship of components or light in different planes, for example, but do not indicate any required orientation of components with respect to true horizontal and vertical orientation.

Where they are used, the terms "first", "second", "third", and so on, do not necessarily denote any ordinal or priority relation, but are used for more clearly distinguishing one element or time interval from another. These descriptors are used to clearly distinguish one element from another similar or related element in the context of the present disclosure and claims.

As used herein, the term "energizable" relates to a device or set of components actuable to perform an indicated function upon receiving power and, optionally, upon receiving an enabling signal. For example, a laser diode is energizable to emit a beam of laser light.

In the context of the present disclosure, the term "approximately", when used with reference to a measurement, means within expected tolerances for measurement error and inaccuracy that are accepted in practice. Some reasonable tolerance must be allowed, for example, for measurement differences and for the precision required in a particular application.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

For the image processing steps described herein, the terms "pixels" for picture image data elements, conventionally used with respect 2-D imaging and image display.

The term "in signal communication" as used in the application means that two or more devices and/or components are capable of communicating with each other via signals that travel over some type of signal path. Signal communication may be wired or wireless. The signal paths may include physical, electrical, magnetic, electromagnetic, optical, wired, and/or wireless connections between the first device and/or component and second device and/or component. The signal paths may also include additional devices and/or components used to direct the signal between the first device and/or component and second device and/or component.

Embodiments of the present disclosure describe apparatus and methods for edge identification for a flat substrate and can be used, for example, to provide precise registration and alignment of an image of the substrate onto a detector, to within sub-pixel accuracy. Advantageously, methods and apparatus of the present disclosure can be integrated with a metrology apparatus such as an interferometry apparatus that characterizes surface flatness once the substrate is in register.

Flatness information that is obtained from surface metrology can be fed back into the manufacturing process. This allows improvement of processes to achieve flatness, for example, as well as compensation for errors that are caused by deviation from perfect flatness. In either case, it is useful to register the flatness information with respect to a datum on the mask that can be identified in each of the different manufacturing steps of the mask. As noted earlier in the background description, fiducial markings are typically added in later patterning stages of mask or reticle fabrication and only appear on one side of the component. Typically, most metrology processes use fiducial marks or alignment marks on the mask which are generated by the patterning process. This approach cannot be applied to all the relevant steps in the manufacturing process that require flatness data, since the required flatness information is very useful even before the mask is patterned. Furthermore, flatness characterization of the back side of the mask, which does not contain any pattern features, can be of value, allowing compensation for variability in mask thickness. To respond to the need for accurate and precise mask positioning for surface characterization and patterning, an embodiment of the present disclosure provides data on the location of the edges of the mask.

The Fizeau interferometer, shown as apparatus 10 in the simplified schematic of FIG. 1, is known as a useful tool for measurement of surface flatness. A coherent light source, such as a laser 12, directs illumination through a beam splitter 14 and to a lens 16 that collimates the illumination and directs it through a reference 18 and the test surface 20. The reflected light from reference 18 and surface 20 combines to generate interference fringes that can be displayed and analyzed using an imaging apparatus 24, that includes optical and electronic components for acquiring and rendering interferometry image results. Because the light reflected from reference 18 and surface 20 share the same optical path, the interference pattern that is detected at apparatus 24 can provide a highly accurate characterization of any slight differences between these surfaces.

Embodiments of the present disclosure can use Fizeau interferometry techniques for measurement of surface flatness, particularly suited for characterizing the surface of a reflective reticle or mask, such as for use in an EUV lithography apparatus. It should be noted, however, that the apparatus and methods described herein can be used for any number of measurement applications where it is useful to characterize flat or substantially flat surfaces.

Figure 2:
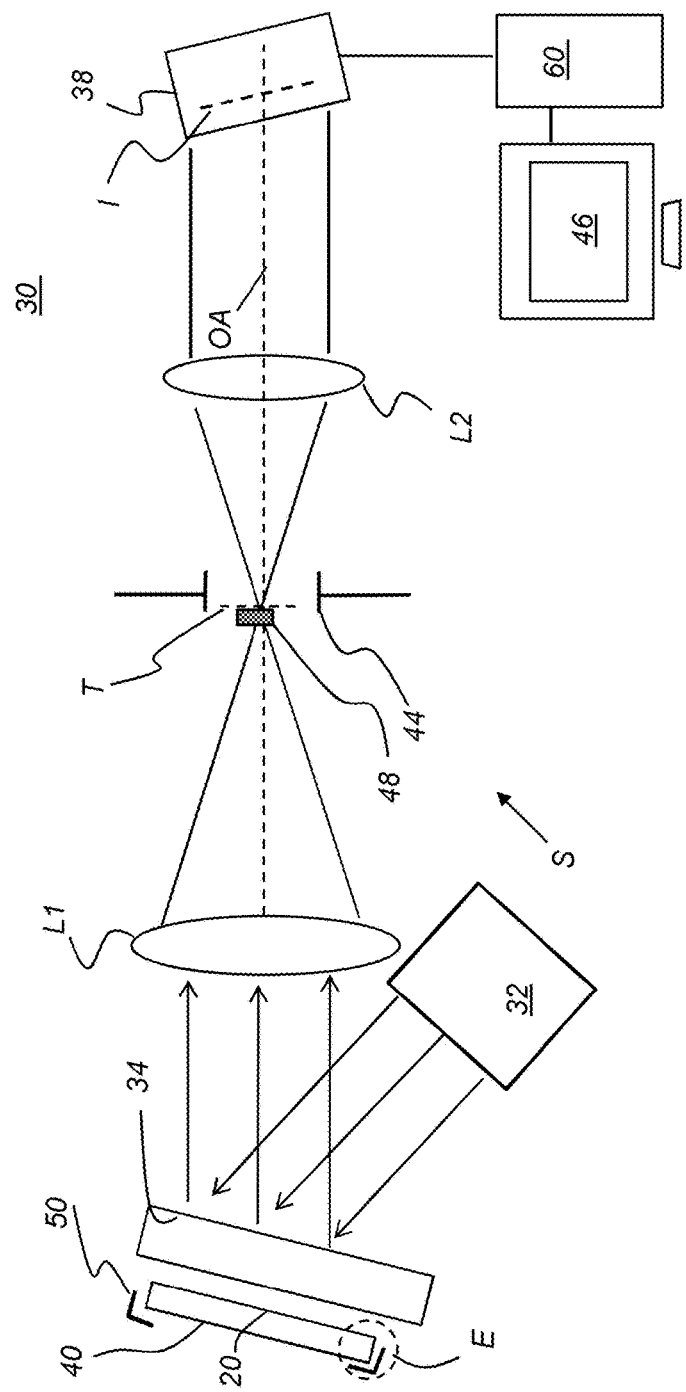
FIG. 2 shows a simplified schematic of the optical path of an interferometry apparatus that applies Fizeau interferometry principles for characterization of a reflective lithography reticle using bright field and dark field imaging.

The diagram of FIG. 2 shows a simplified schematic of the optical path of an interferometry apparatus 30 that applies Fizeau interferometry principles for characterization of a reflective lithography mask or reticle 40 using both bright field and dark field imaging. Focal distances and component sizes are not shown to scale in the schematic diagram of FIG. 2. An illumination source 32 directs a widened beam of collimated illumination to a reference surface 34 and to reticle 40 under test. Reflected light from surface 34 and reticle 40 are focused by a first imaging lens L1 at a Fourier transform plane T at the position of an aperture stop 44. A second imaging lens L2 is disposed to form, at an image plane I and from the light energy at transform plane T, an image of the reticle 40. Imaging lens L2 re-transforms the object at transform plane T to form an image. A sensor array 38, such as a charge-coupled device (CCD) or camera, is disposed at image plane I and forms a pixelated image from the received light. The image is rendered to a display 46 that is in signal communication with the sensor array 38 and in signal communication with a computer 60 or other dedicated control processor for control of instrument functions. As part of a spatial filter S, a spatial filtering element 48, whose function is described in more detail subsequently, is actuable to be disposed at a blocking position. When moved to the blocking position, spatial filtering element 48 blocks a portion of the focused specular or reflected light at transform plane T in order to provide the dark field image that enables detection of the outline of reticle 40. Reticle 40 is removably mounted in a fixture 50. The collimated beam from illumination source 32 is widened so that it impinges on the full surface of reticle 40. The spatial position of light at Fourier transform plane T relates to the angle of the light reflected from the reticle and to the focal length of lens L1. Transform lens L1 converts common angles for light at the reticle to a single position at the spatial filter plane.

As is well known to those skilled in the optical arts, an object being imaged can be described using Fourier series representation that sums a series of sinusoidal terms of increasing spatial frequencies. Interferometry requires using only lower spatial frequencies to produce the interference pattern. Edge imaging for mask registration, on the other hand, requires higher spatial frequencies. The Fourier transform plane is at a location along the optical axis where the amplitude of light representative of each of the sinusoidal terms of the objects can be isolated spatially. According to image formation theory, the Fourier transform plane, for objects illuminated by a plane wave, is at the back focal plane of an objective lens. In practice, this is at a location one focal length away from objective lens L1, with some tolerance, such as +/−0.1 or more of the focal length, allowable for providing filtering slightly ahead of or behind the one focal length position, depending on the filtering accuracy needed. At the Fourier plane, the higher the spatial frequency of the object, the further the corresponding light energy for that frequency from the optical axis. The direction from the optical axis at the Fourier plane is dependent on the clocking of the spatial frequency on the object. A horizontal edge of a mask diffracts incident light into vertical directions at the Fourier plane. Correspondingly, a vertical edge diffracts light into the horizontal direction. For this reason, when imaging a square or rectangular mask, the Fourier plane exhibits a cross pattern.

Light from edges of the mask has higher spatial frequencies; thus, light from an edge is distanced further from the optical axis at the transform plane. Edge imaging is enhanced by blocking or removing the low spatial frequencies near the optical axis, since only the light corresponding to the edges is needed for forming the image at the sensor array. Imaging of corners of the rectangular mask complicates the pattern of light at the transform plane. This includes light at the Fourier plane that is spaced away from the optical axis and that lies outside the vertical and horizontal axes.

Figure 3:
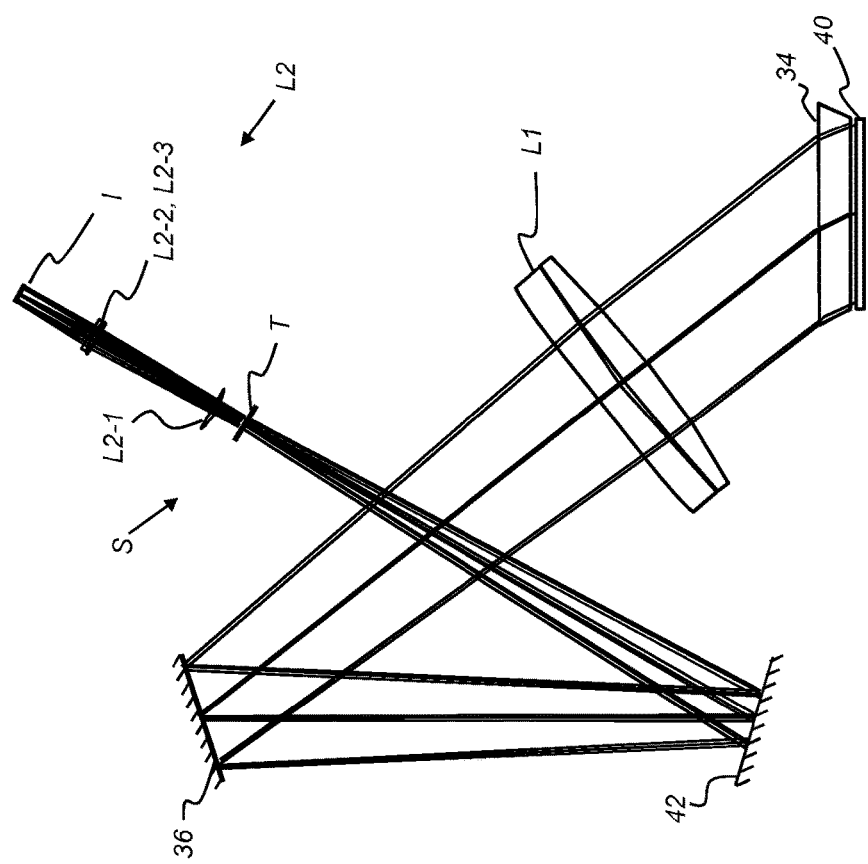
FIG. 3 shows the imaging path for interferometry and positioning metrology used in an embodiment of the present disclosure.

FIG. 3 shows the imaging path used in an embodiment of the present disclosure. Here, two folding mirrors 36 and 42 are used to make the apparatus more compact. Lens L1 is a doublet that has a long focal length, such as approximately 1.4 m. The doublet of this embodiment has two air-spaced lens elements, with separation distance of 2.94 mm. A first lens element of the doublet has 25 mm thickness, with a first convex surface characterized by a first radius of curvature of 782.15 mm and a second convex surface characterized by a second radius of curvature of 1607.35 mm. A second lens element of the doublet, disposed nearer the aperture stop, has a first concave surface with first radius of curvature of 947.42 and a second convex surface with second radius of curvature of 1607.35 mm. Both lens elements are made of NBK7 glass (Schott). The distance from the vertex of the second surface of the second lens element of the doublet to the first surface of a second imaging lens L2 is 1313.55 mm. Lens L1 forms a first Fourier transform lens; its focal plane is Fourier transform plane T at the location of the aperture stop 44 (FIG. 2).

Lens L2 is a second Fourier transform lens, formed as a compound lens with lens elements L2-1, L2-2, and L2-3 providing an inverse transform that forms image plane I from the light at transform plane T. An exemplary focal length for lens L2 is approximately 130 mm. The vertex of the first surface of lens element L2-1 is 25 mm from the aperture stop, transform plane T. The first surface of lens element L2-1 is convex, with a first radius of curvature 128.77 mm. Lens element L2-1 is formed from NBK7 optical glass and has a thickness of 2.62 mm. A second surface of lens element L2-1 is plano. Lens elements L2-2 and L2-3 form a doublet with first and second cemented lens elements. According to this embodiment, the first cemented lens element has thickness of 4.92 mm, a first convex surface characterized by a first radius of curvature of 81.53 mm and a second convex surface characterized by a second radius of curvature that is 56.59 mm; the second cemented lens element has a first concave surface with radius of curvature of 56.59 mm (same as the second radius of curvature of the preceding cemented lens element) and a second convex surface with a second radius of curvature of 220.1 mm. In this embodiment, the distance from the second surface of the second element of this cemented doublet to the image surface is 66.88 mm.

The imaging apparatus shown in FIGS. 2 and 3 can provide Fizeau interferometry for surface characterization of a reticle or other flat component as well as providing data for accurate and repeatable positioning of the component. In order to achieve precise positioning, it is useful to be able to accurately identify the edges of the component when seated in its fixture. The edge identification should be unambiguous, allowing automated detection of the edge according to measured image data from the camera or other sensor array 38. To provide this level of accuracy, embodiments of the present disclosure can employ the basic arrangement of components described with reference to FIGS. 2 and 3 and add features to obtain dark field imaging of component edges.

Figure 4A:
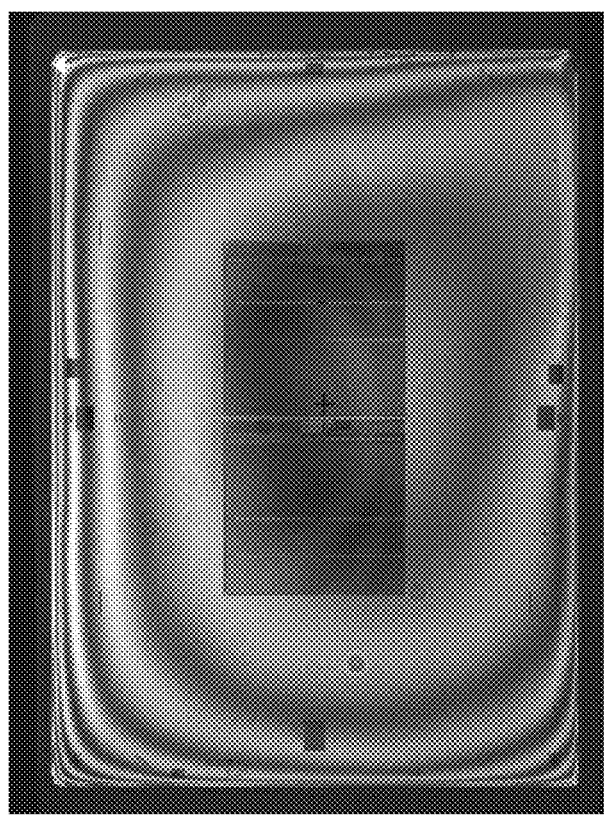
FIG. 4A shows a bright field image as conventionally obtained using an interferometry apparatus.
Figure 4B:
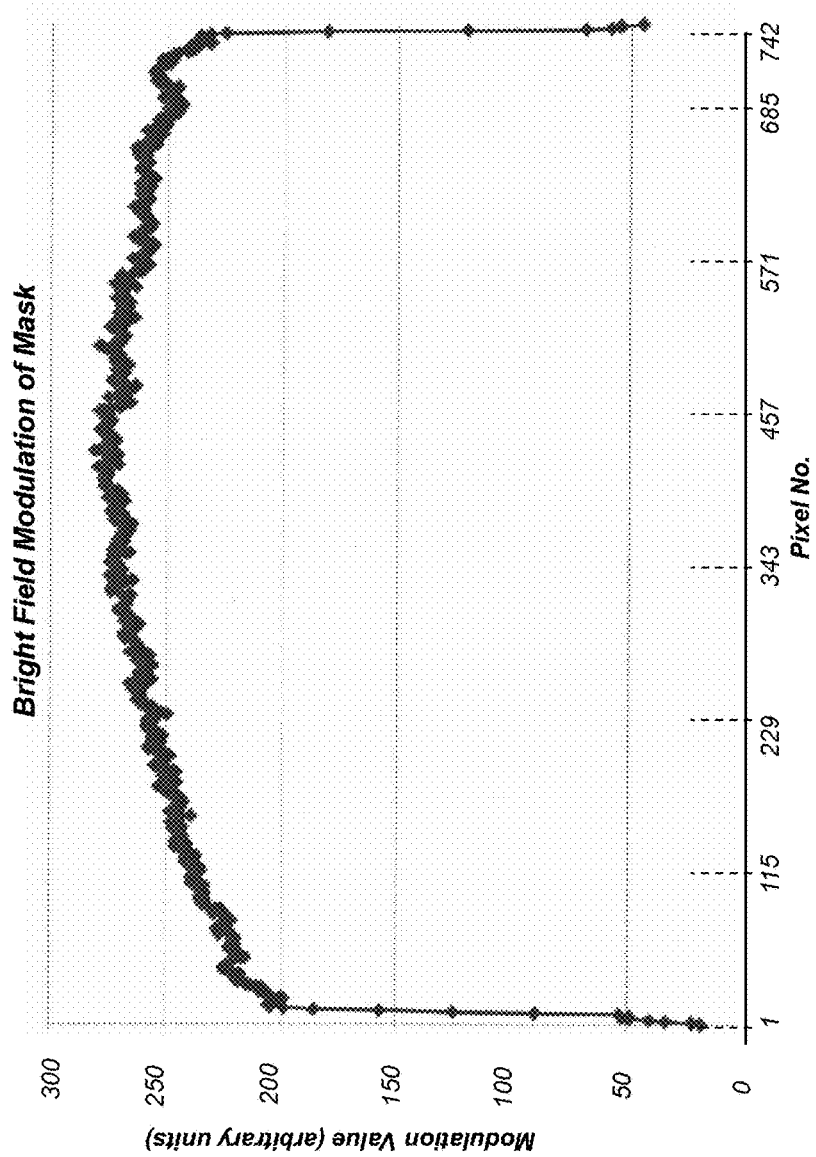
FIG. 4B is a graph that shows a mapping of data modulation values for camera pixels along a single horizontal line that extends across an exemplary bright field image.

For a more complete understanding of apparatus and methods described herein, it is useful to compare bright field imaging and dark field imaging and how these different methods relate to accurately indicating the outline of a component. By way of example, FIG. 4A shows a bright field image as conventionally obtained using an interferometry apparatus such as those described with relation to the Fizeau interferometry arrangement of FIGS. 1, 2, and 3. The edges of the test surface are perceptible in the bright field image; however, the exact edges of the component can be very difficult to pinpoint in such an image. At the pixel level, edges are not sharply defined. As a further complication, using the image data itself, generated at the camera or sensor array, may not help to resolve the ambiguity with bright field content. The graph of FIG. 4B shows a mapping of data modulation values for camera pixels along a single horizontal line that extends across an exemplary bright field image of a flat test surface. The data shows edges having a rising or falling slope; however, it can be unclear, at the pixel level, exactly which modulation value determines the exact edge of the component. In practice, some arbitrary modulation threshold must be used to define the edge; this value may be changed from one view to the next.

Figure 5A:
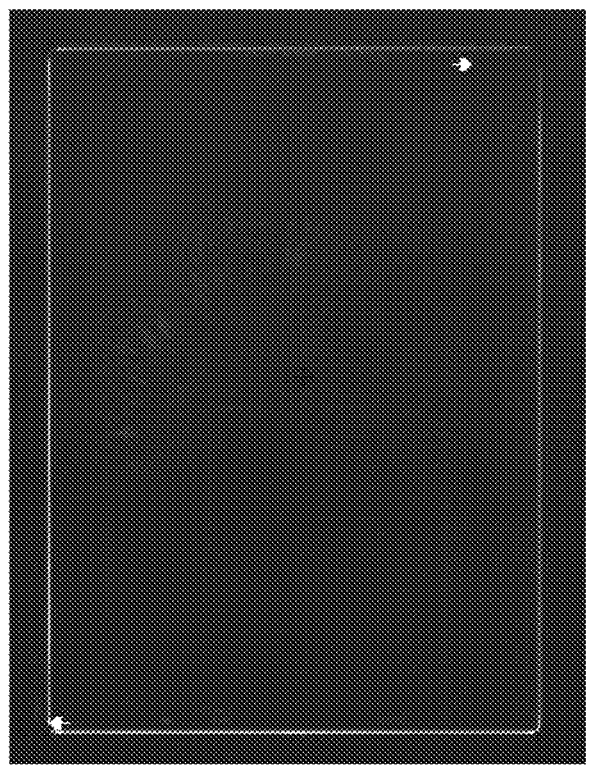
FIG. 5A shows a dark field image that can be obtained using the interferometry apparatus of the present disclosure.
Figure 5B:
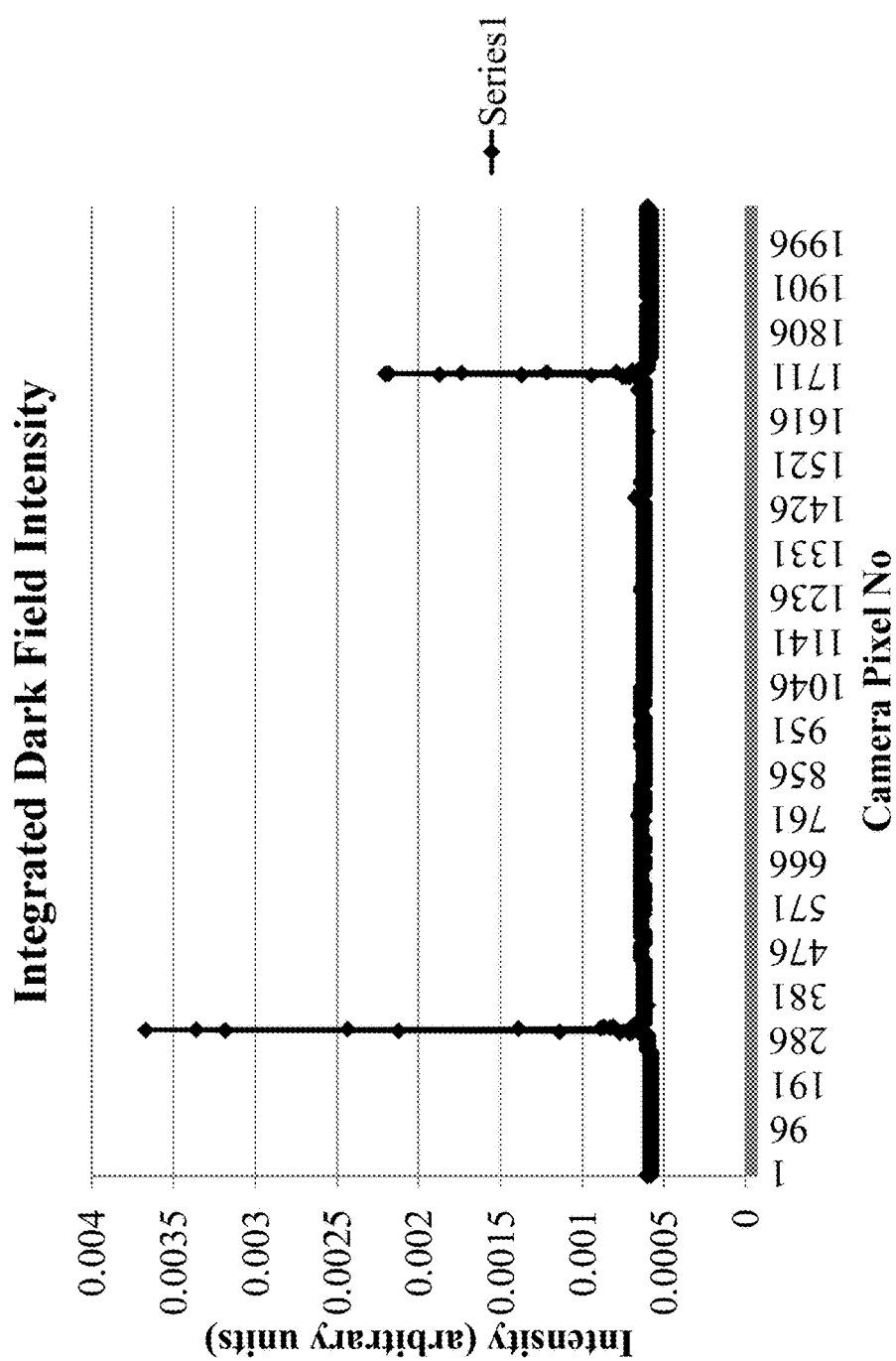
FIG. 5B is a graph that shows the corresponding mapping of data modulation values for camera pixels along a single horizontal line that extends across an exemplary dark field image.

By comparison with the given bright field examples, FIG. 5A shows a dark field image D that can be obtained using the interferometry apparatus described. The component outline is sharply defined. The graph of FIG. 5B shows the corresponding mapping of data modulation values for camera pixels along a single horizontal line that extends across an exemplary dark field image. Here, the data clearly shows a peak modulation value that can serve to positively and unambiguously identify the component edges.

With respect to the apparatus shown in FIGS. 2 and 3, the respective bright field and dark field images are formed from different light content that is provided to camera or sensor array 38. Most of the light that is directed back from reticle 40 and surface 34, when illuminated from illumination source 32, is specular light that forms the bright field image of FIG. 4A. By comparison, the dark field image of FIG. 5A is formed from scattered and diffracted light, caused by edge effects from the test surface and by surface irregularities.

Figure 6:
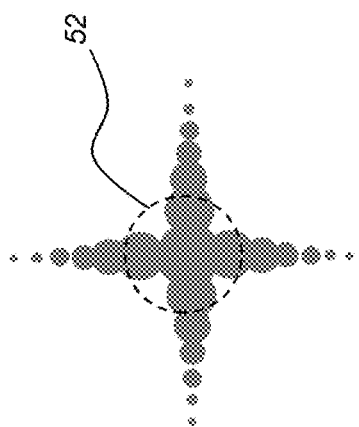
FIG. 6 shows, in an idealized representation, the spatial distribution of the illumination from a reticle and Fizeau reference surface as it appears at a Fourier transform plane.

FIG. 6 shows, in an idealized representation, the spatial distribution of the illumination from reticle 40 and surface 34 as it appears at Fourier transform plane T. A dashed circle 52 outlines the bulk of the light energy that is provided from Lens L1 at transform plane T. The light content within the dashed circle 52 largely represents specular light energy, reflected from the reticle component and reference surfaces and usable for interferometry. Light energy that lies outside circle 52 is scattered or diffracted energy. Light energy that is spatially distributed outside circle 52 at transform plane T is largely considered to be unwanted noise in the bright field image that is generated for conventional interferometry. Aperture stop 44 can be configured to block this non-specular light energy at the transform plane when performing interferometry.

According to an embodiment of the present disclosure, spatial filtering can help to provide improved metrology for interferometry apparatus 30 (FIG. 2) in two ways. To improve interferometry, performed using bright field imaging, aperture stop 44 provides spatial filtering that passes the low spatial frequencies, centered more closely around the optical axis OA, and blocks higher spatial frequencies that are distributed more distance from axis OA at transform plane T. To improve edge detection by apparatus 30, performed using dark field imaging as described herein, spatial filtering element 48 blocks lower spatial frequencies and passes higher spatial frequencies as described.

In order to form a dark field image, the specular energy represented within circle 52 is blocked, so that lens L2 forms an image only from scattered or diffracted light energy, such as from diffraction at an edge E of reticle 40, as shown schematically in FIG. 2.

Figure 7A:
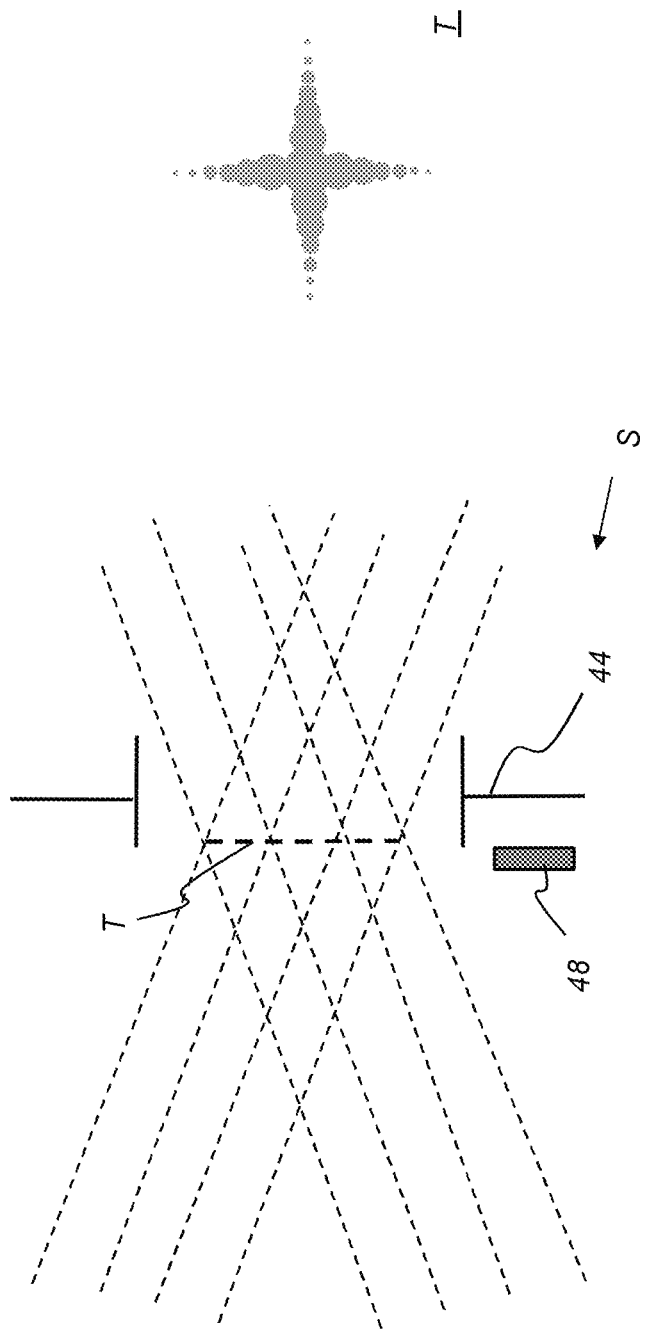
FIG. 7A shows an enlarged view of the Fourier transform plane in a bright field imaging mode.

FIGS. 7A, 7B, 8A, and 8B show features for spatial filtering, such as aperture stop 44 and spatial filtering element 48, used to selectively block unwanted light from the image acquired by camera or sensor array 38 for dark field imaging. FIG. 7A shows an enlarged side view of Fourier transform plane T for bright field imaging, with an accompanying plan view of transform plane T as seen by lens L2 shown on the right side. To provide bright field imaging, filtering element 48 is actuated to an unobstructing position, out of the way of light at plane T. FIG. 7B shows filtering element 48 actuated to an obstructing position for dark field imaging, with a corresponding schematic view of transform plane T as seen by lens L2.

Figure 8A:
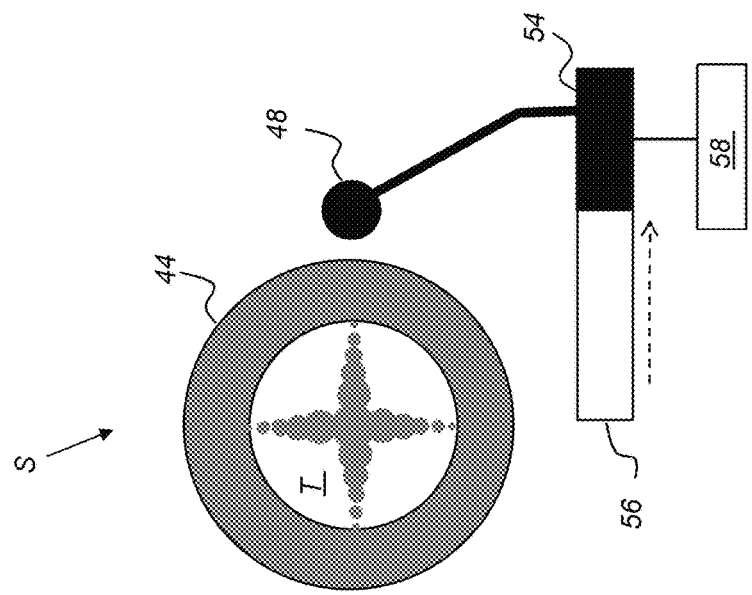
FIGS. 8A and 8B show corresponding bright field and dark field imaging views as plan views of the Fourier transform plane, taken orthogonal to the optical path.
Figure 8B:
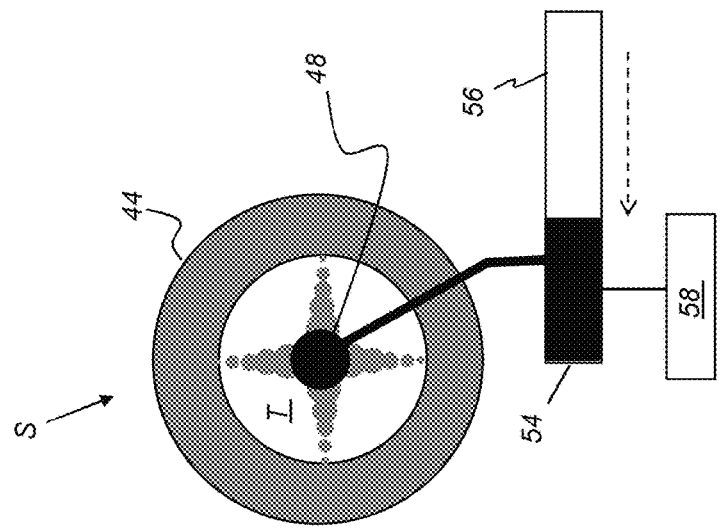

FIGS. 8A and 8B show component positioning for corresponding bright field and dark field imaging views as plan views of transform plane T, taken orthogonal to the optical path. In the FIG. 8A, 8B embodiment, filtering element 48 is coupled to a motorized stage 54 on an actuator 56 that slides filtering element 48 out from or into the optical path. To effect this movement, actuator 56 is under control of a control processor 58 that responds to an operator command, such as a keyboard command, a control logic command, or switch setting (not shown) for a switch that is in signal communication with computer 60 (FIG. 2). It can be appreciated that spatial filtering element 48 can be any of a number of types of light-blocking devices of suitable size and shape for blocking spectral light and allowing passage of scattered and diffracted light and can be actuated manually or by any number of devices, including solenoids, for example. Spatial filter element 48 is shaped and dimensioned to block the specular (reflected) light that lies close to the optical axis at the transform plane T and to transmit the diffracted and scattered light that is peripheral to the optical axis. The exact shape and dimensions of filter element 48 can be determined by measuring and mapping the spatial distribution of light energy at the transform plane T and can be adjusted by factors such as actual distance of the filter element 48 from the transform plane T and back focal distance of lens L2, for example. Referring back to the exemplary embodiment shown in FIG. 3, according to this embodiment the aperture stop has a 12 mm diameter. The diameter of the filtering element used to block specular light at transform plane T is about 3 mm.

According to an alternate embodiment of the present disclosure, spatial filter S has both aperture stop 44 and spatial filtering element 48 as movable components. Aperture stop 44 can be actuated to have a first position centered about the optical axis OA for bright field imaging such as for interferometry, and a second position, away from light along optical axis OA, for edge detection. Spatial filtering element 48 would be actuated with the opposite state, removed from axis OA for bright field imaging and blocking optical axis OA for dark field imaging.

Figure 9:
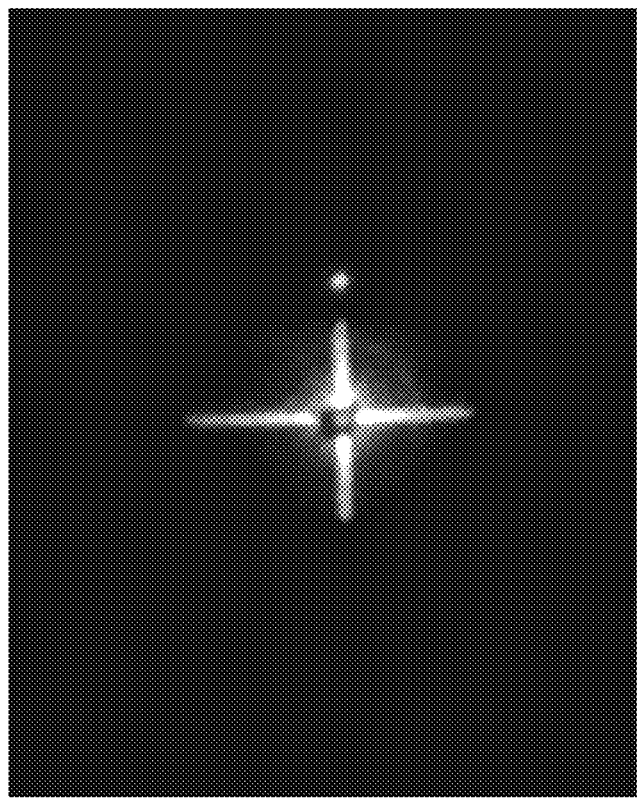
FIG. 9 is a plan view of a Fourier transform from the surface under test and reference light.

FIG. 9 is a plan view of Fourier transform plane T. It can be observed that there is an additional area of light energy, shown as a bright dot to the right of the transform pattern. This energy can be light from secondary reflection at an additional surface of the Fizeau reference, opposite reference surface 34. Aperture stop 44 (FIG. 7A) can be adjusted, such as by being narrowed, to eliminate this unwanted light from the dark field image.

According to an embodiment of the present disclosure, using the actuable filtering element 48 as shown in FIGS. 7A through 8B, for example, interferometry apparatus 30 can thus be configured to selectively allow both bright field and dark field imaging modes. When reticle 40 or other sample under test is fitted into its fixture 50, dark field imaging mode is enabled by the operator in order to definitively identify the outline of the reticle 40 or other sample surface for precise registration to pixel locations as observed on display 46. Then, once the registration has been achieved, bright field imaging mode can be enabled for obtaining accurate surface characterization using interferometry. This feature helps to further enhance the speed of measurement and analysis over conventional methods.

One approach to help determine the exact location for the edge of the mask from the dark field image data is to proceed row-by-row and integrate the intensity values across all of the columns to determine two of the edges. Similarly, integrating across all of the rows can be used to determine the other two edges. This data processing technique results in a single intensity distribution for each of the camera axes whose peak values determine the edge locations for the two mask edges in each orthogonal direction. By minimizing the width of the intensity peaks in the integrated intensity curve, it becomes possible to accurately align the mask edges with the camera array.

Figure 10:
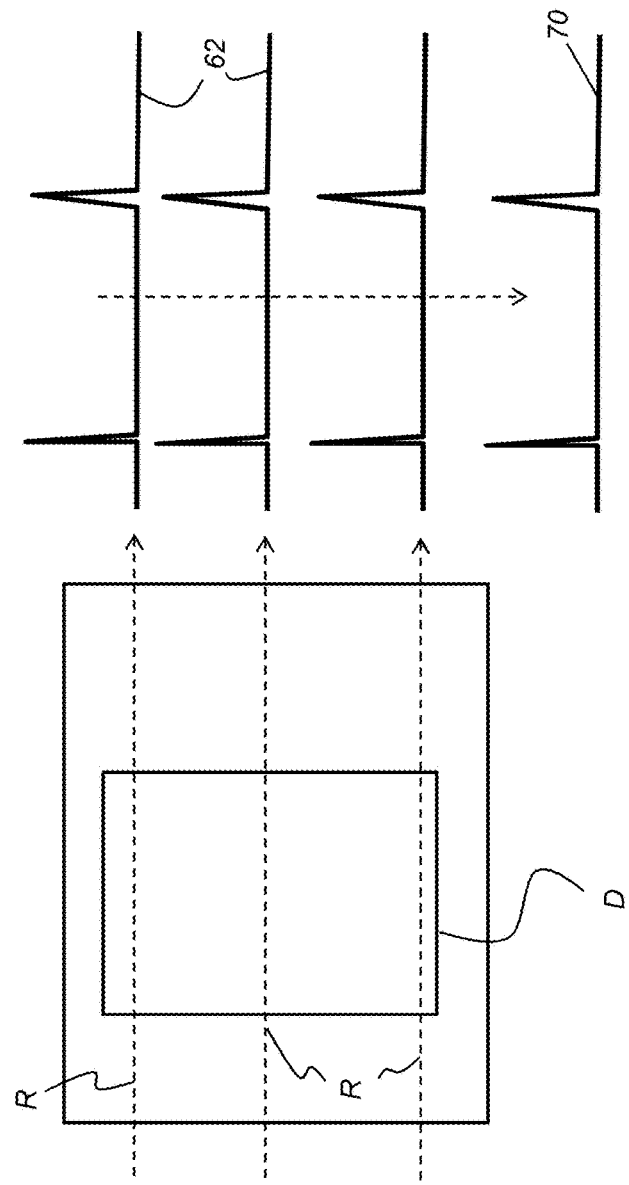
FIG. 10 shows, in schematic form, how outline data for registration of a reticle can be obtained from the image data acquired by the sensor array.

FIG. 10 shows, in schematic form, how outline data for registration of reticle 40 can be obtained from the image data acquired by sensor array 38 (FIG. 2). For each row R of the generated dark field image D, the successive data values from the imaging sensor are obtained, as represented schematically by graphed values 62 in FIG. 10. The corresponding "column" values for successive rows are then combined, such as by averaging, integration, or other operation and a registration profile 70 generated from the combined row data. Analysis of profile 70 can yield useful information on skew angle as well as position of an edge.

It should be noted that a metrology apparatus that provides both bright field imaging for interferometry and dark field imaging for edge registration, as shown schematically in the examples of FIGS. 7A/7B and 8A/8B, can have advantages for surface characterization of a reticle, mask, or other flat optical component. Because only spatial filtering element 48 is moved either into, or away from, its blocking position along the optical axis and no other optics change position, the respective bright field and dark field images can be obtained using the same camera or other sensor and are aligned to each other. This makes it straightforward to register flatness information with surface position and location. This also simplifies registration of flatness profiles for both front and back surfaces to each other. A toggle command can be provided to an operator of the interferometry apparatus, allowing the display of either the bright field interferometry image or the dark field edge image or both, such as overlaid, on the same display.

Implementations of the processes for control of actuators for substrate positioning metrology, as well as of the illumination source and sensor array or camera for image acquisition, image data processing, frequency signal analysis, and results reporting, transmission, and display for the apparatus and methods described herein may be executed using instructions stored in digital electronic circuitry, or in computer 60 hardware, firmware, or software, or in combinations of hardware and software logic. Algorithm and control logic may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and can be deployed in any form, including as a stand-alone program or as a module, component, subroutine, or other unit suitable for use in a computing environment. A computer program can be deployed to be executed on one computer 60 or on multiple computers at one site or distributed across multiple sites and interconnected by a communication network.

Method steps may be performed by one or more programmable processors executing a computer program to perform functions by operating on input data and generating output. Some or all of the method steps also may be performed by, and an apparatus may be implemented as, special purpose logic circuitry, e.g., an FPGA (field programmable gate array) or an ASIC (application-specific integrated circuit).

Processors suitable for the execution of a computer program as control logic processor or computer 60 as described herein include, by way of example, both general and special purpose microprocessors, and any one or more processors of any kind of digital computer. Generally, a processor will receive instructions and data from a non-transitory memory, such as a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile and/or non-transitory memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, various embodiments of the present disclosure may be implemented on a computer having a display device, e.g., a liquid crystal display (LCD) monitor, for displaying information to the user and a keyboard and a pointing device, e.g., a mouse or a touch screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A metrology apparatus comprising:
    a) an illumination source that directs collimated light to a reference surface and to an optical component having a test surface that is in parallel with the reference surface;
    b) a first imaging lens that defines, along an optical axis, a Fourier transform plane for light reflected from both the reference surface and the test surface;
    c) a spatial filtering element that is actuable to a blocking position that blocks specular light on the optical axis and passes other light at the transform plane;
    d) a second imaging lens that forms, at an image plane, an image of the test surface; and
    e) a sensor array disposed to generate image data from received light at the image plane.

2. The apparatus of claim 1 further comprising a display in signal communication with the sensor array for rendering the generated image data.

3. The apparatus of claim 1 wherein the test surface is a reflective reticle or mask.

4. The apparatus of claim 1 further comprising an aperture stop that is adjustable to block a portion of light at the transform plane.

5. A metrology apparatus comprising:
    a) an interferometer having a test surface and a reference surface;
    b) a first imaging lens that defines, along an optical axis, a Fourier transform plane for light reflected from the test and reference surfaces;
    c) a spatial filtering element that is actuable to a blocking position that blocks specular light on the optical axis from the test and reference surfaces at the Fourier transform plane and allows passage of scattered or diffracted light from the test surface;
    d) a second imaging lens that is disposed to form, at an image plane, an image of the test surface, from the light at the transform plane;
    e) a sensor array disposed to generate image data from received light at the image plane; and
    f) a display in signal communication with the sensor array for rendering the generated image data.

6. The apparatus of claim 5 wherein the spatial filtering element is further actuable to alternate between the blocking position and a second, unblocking position removed from the transform plane.

7. The apparatus of claim 5 wherein the rendered display is a dark field image when the spatial filtering element is in the blocking position.

8. The apparatus of claim 5 wherein the spatial filtering element is actuated along a slide motorized stage.

9. The apparatus of claim 5 wherein the spatial filtering element is actuated by a solenoid.

10. The apparatus of claim 5 further comprising an aperture stop at a stop position along the transform plane, wherein the aperture stop passes specular light from the test and reference surfaces and blocks scattered or diffracted light from the test surface.

11. A method for substrate registration in an interferometer, the method comprising:
    a) directing a collimated light to a reference surface and to an optical component having a test surface disposed in parallel with the reference surface;
    b) forming a Fourier transform plane along an optical axis with light reflected from the reference surface and the test surface;
    c) actuating a spatial filtering element to a blocking position that blocks at least a portion of the reflected light on the optical axis at the transform plane;
    d) forming a dark field image of the test surface at an image plane, from the light at the transform plane; and
    e) acquiring image data from a sensor array that is disposed at the image plane.

12. The method of claim 11 further comprising displaying the dark field image from the sensor array image data.

13. The method of claim 11 further comprising actuating the filtering element to an unblocked position for reflected light at the transform plane and displaying a bright field image formed at the image plane and detected by the sensor array.

14. The method of claim 13 further comprising registering the dark field image to the bright field image and rendering the dark and bright field images on a display.

15. The method of claim 11 further comprising detecting an edge of the test surface by analyzing image data acquired from the sensor array.

* * * * *

UNITED STATES PATENT AND TRADEMARK OFFICE
CERTIFICATE OF CORRECTION

PATENT NO. : 10,488,176 B2
APPLICATION NO. : 15/624222
DATED : November 26, 2019
INVENTOR(S) : Thomas James Dunn et al.

Page 1 of 1

It is certified that error appears in the above-identified patent and that said Letters Patent is hereby corrected as shown below:

In the Claims

In Column 12, Line 16, Claim 8, after "along a" delete "slide".

Signed and Sealed this
Eighteenth Day of February, 2020

Andrei Iancu
*Director of the United States Patent and Trademark Office*